United States Patent [19]

Lukich

[11] Patent Number: 5,525,043
[45] Date of Patent: Jun. 11, 1996

[54] HYDRAULIC POWER CONTROL SYSTEM

[75] Inventor: Michael S. Lukich, Peoria, Ill.

[73] Assignee: Caterpillar Inc., Peoria, Ill.

[21] Appl. No.: 173,742

[22] Filed: Dec. 23, 1993

[51] Int. Cl.⁶ .................................................. F04B 49/12
[52] U.S. Cl. ............................................. 417/218; 60/431
[58] Field of Search ............................... 417/216, 218, 417/18, 22, 44.2; 60/431; 123/382, 383

[56] References Cited

U.S. PATENT DOCUMENTS

| | | | |
|---|---|---|---|
| 3,273,344 | 9/1966 | Christenson | 60/53 |
| 3,587,540 | 6/1971 | Hoffmann | 123/102 |
| 3,679,327 | 7/1972 | Riedhammer et al. | 417/222 |
| 3,768,928 | 10/1973 | Miller et al. | 417/213 |
| 3,788,775 | 1/1974 | Leutner et al. | 417/222 |
| 3,792,791 | 2/1974 | Fleming et al. | 214/762 |
| 3,796,197 | 3/1974 | Locher et al. | 123/32 |
| 3,797,465 | 3/1974 | Hobo et al. | 123/32 |
| 3,812,676 | 5/1974 | Smith | 60/431 |
| 3,841,795 | 10/1974 | Ferre et al. | 417/216 |
| 3,890,360 | 6/1975 | Pruvot et al. | 60/431 |
| 3,891,354 | 6/1975 | Bosch | 417/216 |
| 3,914,938 | 10/1975 | Cornell et al. | 60/395 |
| 3,916,862 | 11/1975 | Clouse et al. | 123/140 |
| 3,963,378 | 6/1976 | McMillan | 417/216 |
| 3,969,896 | 7/1976 | Louis | 60/431 |
| 3,973,537 | 8/1976 | Williams et al. | 123/139 |
| 3,975,909 | 8/1976 | McBurnett | 60/421 |
| 3,988,892 | 11/1976 | Bosch | 60/420 |
| 4,024,710 | 5/1977 | Zelle | 60/420 |
| 4,027,738 | 6/1977 | Lundin | 180/14 A |
| 4,074,529 | 2/1978 | Budzich | 60/445 |
| 4,074,955 | 2/1978 | Nonnemacher | 417/218 |
| 4,103,489 | 8/1978 | Fletcher | 60/395 |
| 4,158,290 | 6/1979 | Cornell | 60/445 |
| 4,180,979 | 1/1980 | Cornell | 60/395 |
| 4,205,639 | 6/1980 | Kawase et al. | 123/102 |
| 4,248,188 | 2/1981 | Wilson et al. | 123/382 |
| 4,248,194 | 2/1981 | Drutchas et al. | 123/357 |
| 4,373,850 | 2/1983 | Durham | 414/699 |
| 4,395,199 | 7/1983 | Izumi et al. | 417/53 |
| 4,456,434 | 6/1984 | El Ibiary | 417/218 |
| 4,459,806 | 7/1984 | Falk | 60/327 |
| 4,489,552 | 12/1984 | Watanabe et al. | 60/389 |
| 4,502,437 | 3/1985 | Voss | 123/383 |
| 4,523,892 | 6/1985 | Mitchell et al. | 417/34 |
| 4,528,813 | 7/1985 | Izumi et al. | 417/218 |
| 4,534,707 | 8/1985 | Mitchell | 417/34 |
| 4,606,313 | 8/1986 | Izumi et al. | 123/386 |
| 4,712,376 | 12/1987 | Hadank et al. | 60/427 |
| 4,741,159 | 5/1988 | Gunda et al. | 60/443 |
| 4,773,369 | 9/1988 | Kobayashi et al. | 123/357 |
| 4,904,161 | 2/1990 | Kamide et al. | 417/22 |
| 4,942,737 | 7/1990 | Tatsumi | 60/431 |
| 5,077,973 | 1/1992 | Suzuki et al. | 60/428 |
| 5,117,632 | 6/1992 | Strenzke | 60/327 |
| 5,152,143 | 10/1992 | Kajita et al. | 60/420 |
| 5,160,244 | 11/1992 | Kuwabara et al. | 417/36 |
| 5,176,504 | 1/1993 | Moriya et al. | 417/216 |
| 5,177,964 | 1/1993 | Tanaka et al. | 60/445 |
| 5,214,916 | 6/1993 | Lukich | 60/431 |

FOREIGN PATENT DOCUMENTS

0451274A1  10/1991  European Pat. Off. .

Primary Examiner—Peter Korytnyk
Attorney, Agent, or Firm—Steven R. Janda; R. Carl Wilbur

[57] ABSTRACT

Large work vehicles include hydraulic implement control systems having an hydraulic pump being driven by an internal combustion engine. The subject invention provides a method and apparatus for controlling such an hydraulic system to limit engine lug. The invention includes a sensor for producing a parameter signal indicating the load on the engine and a pump control for varying the displacement of the variable displacement pump in response to engine load increasing above a predefined level. The response of the pump control is restricted to allow the engine to reach a predefined operating state.

9 Claims, 6 Drawing Sheets

Fig_4b

HYDRAULIC POWER CONTROL SYSTEM

DESCRIPTION

1. Technical Field

This invention relates generally to an apparatus for controlling a hydraulic system and more particularly to a hydraulic control system for modifying system performance in response to sensed parameters.

2. Background Art

Large construction machines having hydraulically controlled implements often include one or more variable displacement hydraulic pumps being driven by an internal combustion engine. As the operator manipulates the hydraulically controlled implement through one or more levers or other input devices, the hydraulic system responds by directing hydraulic fluid flow to the appropriate hydraulic circuits. Thus, the operator requests the implement to move in a desired direction at a prescribed velocity and to apply a desired amount of force by manipulating the appropriate input device.

As requested hydraulic effort increases, the hydraulic control system increases the displacement of the variable displacement hydraulic pump such that the amount of hydraulic flow increases. Since the amount of torque required to drive the hydraulic pump is a function of pressure and flow, as flow and pressure increase, a higher load is applied to the internal combustion engine. Thus, engine load is a function of hydraulic flow and pressure.

Under many operating conditions, the amount of hydraulic power exceeds the amount of power the engine is capable of producing at that engine speed. When this occurs, the rotational speed of the engine decreases along its lug curve. This condition is known in the industry as engine lug. In the extreme, the engine may actually stall if the requested power becomes too high.

To avoid stalling the engine, skilled operators typically reduce the amount of power being requested by the hydraulic system when they sense a loss of engine speed. While this action avoids engine stall, even skilled operators overcompensate and therefore unnecessarily reduce the amount of hydraulic work the implement is truly capable of performing. As a result, machine productivity is reduced.

Fuel mixture combustion during engine lug also becomes less efficient resulting in increased transient emissions and reduced fuel economy. It is therefore desirable to eliminate engine lug to reduce emissions and fuel consumption.

Some level of engine lug, however, is desired by operators because it provides an indication that the machine is operating at maximum capacity. Without engine lug, it is very difficult for an operator to recognize that the maximum amount of work is being performed. The degree of lug must therefore be managed to provide an indication that maximum work effort is being expended while limiting emissions and fuel consumption.

Prior art systems have not fully addressed the problem at hand since the prior art controls do not include input from all relevant parameters. The typical hydraulic system is complex and includes a number of parameters that may be sensed to provide indications of operating conditions. As is well-known in the art of control systems, the overall system can be controlled more efficiently and effectively if several key paramters are used by the control algorithm.

Prior art hydraulic system controls have not fully integrated engine speed governing with many of the available sensed parameters. For example, some prior art systems control the amount of fuel injected into each cylinder in response to only engine speed or in response to only discharge pressure without responding to both of the above parameters simultaneously. No prior art utilizes turbocharger boost pressure and/or pump swasher displacement. Similarly pump displacement has been altered in response to engine speed deviation and pump discharge pressure while ignoring boost pressure. Even though these systems are moderately effective, such systems fail to maximize system efficiency and make precise control of engine speed difficult due to problems of engine speed and/or pump displacement overshoot and oscillation.

Figure 1:
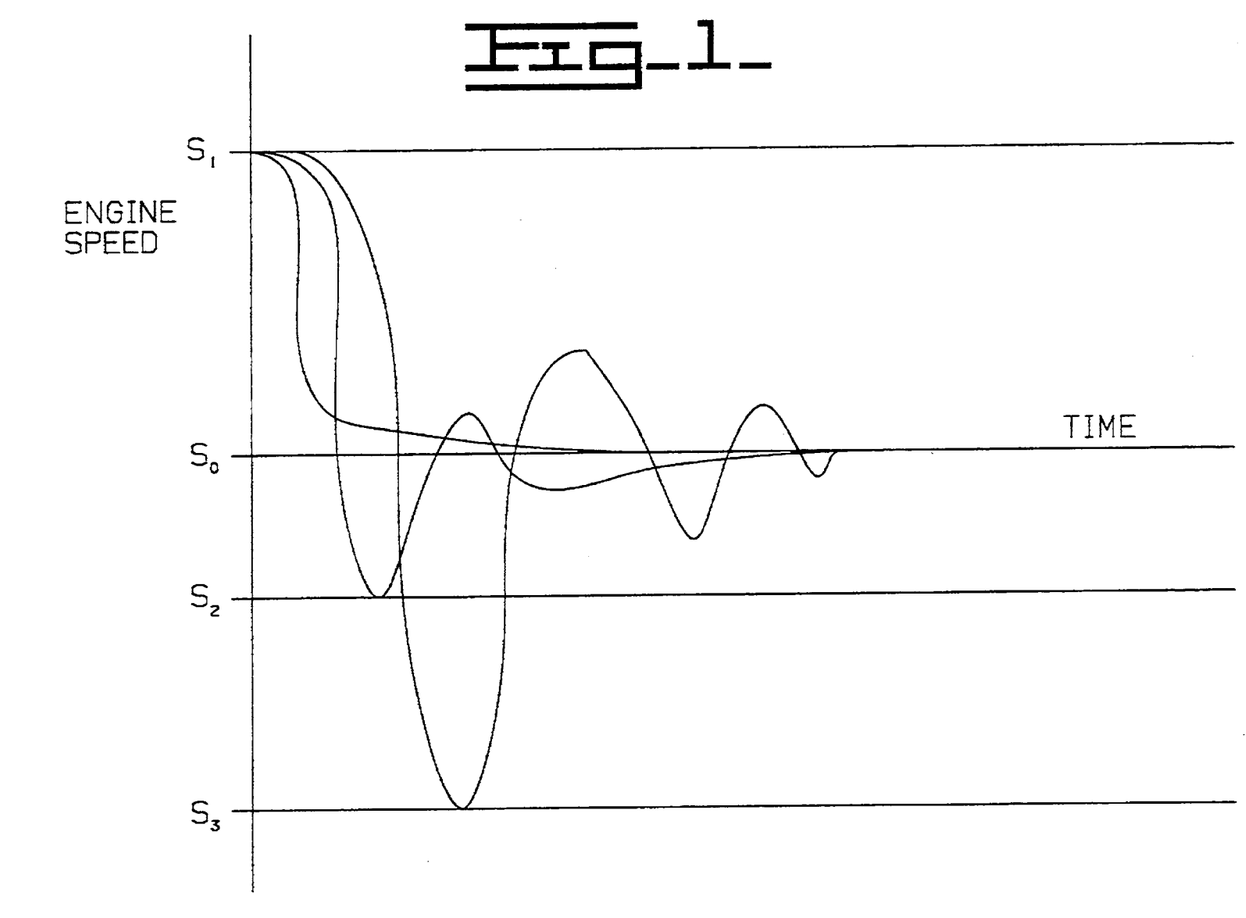
FIG. 1 is a graphical representation of engine speed with respect to time.

Referring to FIG. 1, an ideal engine underspeed control system either eliminates engine lug altogether whereby engine speed will never drop substantially below S1 or allows engine speed to reduce directly from S1 to S0 with a minimum of overshoot and oscillation, where S0 is maximum engine horsepower. In relatively primitive systems using only a single sensed parameter such as engine speed, overshoot and oscillation are typically very large and are represented by the plot trace dropping initially from S1 to S3. The more measurements of key system parameters are used and the more responsive the control is to these parameters, the more overshoot and oscillation can be reduced. An intermediate system is represented by the plot trace that drops initially from S1 to S2 and ultimately settles at S0. As described above, S0 can be selected to be at a level that provides an indication of maximum power output Without reducing fuel consumption and increasing emissions significantly.

The present invention is directed towards overcoming one or more of the problems set forth above.

DISCLOSURE OF THE INVENTION

The invention provides a flexible and responsive system for controlling a hydraulic system to control engine lug while the hydraulic system is operating. Advantageously, emissions are reduced and operator productivity is increased through improved control of the hydraulic system.

In one aspect of the present invention, an apparatus is provided for controlling a hydraulic system having an engine and a variable displacement pump. The apparatus includes a sensor for producing a parameter signal indicating the load on the engine and a pump control for varying the displacement of the variable displacement pump in response to engine load increasing above a predefined level. The response of the pump control is restricted to allow the engine to reach a predefined operating state.

The invention also includes other features and advantages that will become apparent from a more detailed study of the drawings and specification.

BRIEF DESCRIPTION OF THE DRAWINGS

For a better understanding of the present invention, reference may be made to the accompanying drawings, in which.

BEST MODE FOR CARRYING OUT THE INVENTION

Figure 2:
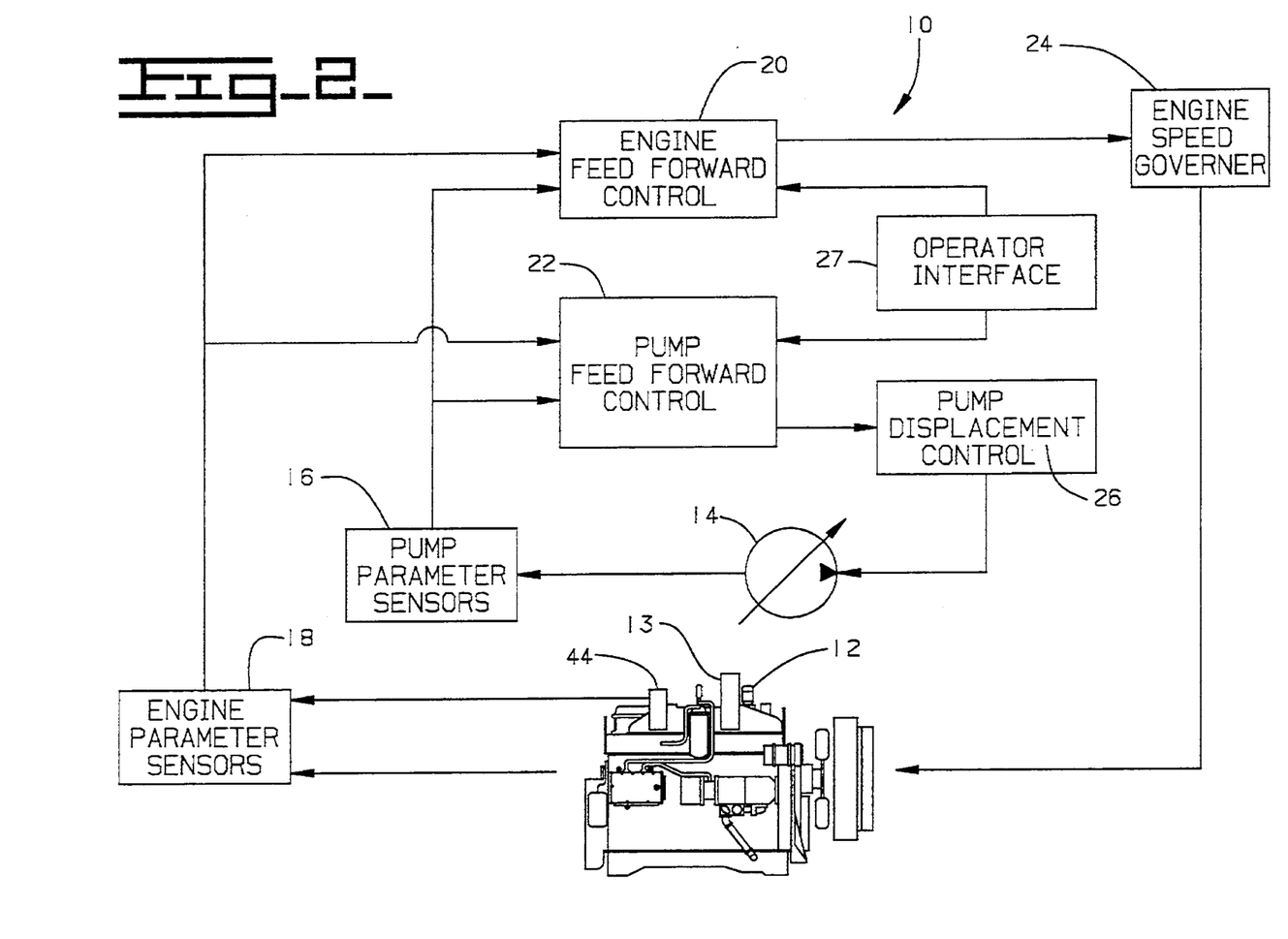
FIG. 2 is a diagrammatic illustration of an integrated engine and hydraulic pump control.

Referring to FIG. 2, a hydraulic power control system is indicated generally by the reference numeral 10. The hydraulic system of large construction machines, for example hydraulic excavators, typically include an internal combustion engine 12 driving one or more variable displacement hydraulic pumps 14 in a manner well-known in the art. Advantageously, the internal combustion engine 12 includes a turbocharger (13) and the variable displacement hydraulic pump 14 includes a swasher being rotatable for varying pump displacement.

In accordance with the present invention, the hydraulic power control system 10 includes pump parameter sensors, referred to generally by the numeral 16, and engine parameter sensors, referred to generally by the numeral 18. In the preferred embodiment, the pump parameter sensors 16 include a pump discharge sensor for indicating the pressure of hydraulic fluid leaving the hydraulic pump 14 and a pump displacement sensor for indicating the degree of displacement (swasher angle) of the hydraulic pump 14. The engine parameter sensors 18 preferably include a boost 44 pressure sensor located at the inlet manifold of the engine 12 downstream of the turbocharger 13, an ambient atmospheric pressure sensor, and an engine speed sensor. It should be appreciated, however, that other combinations may be used to effectively control the hydraulic power system.

In the preferred embodiment, the engine speed sensor is a magnetic pick-up device sensitive to the movement of a gear tooth in an engine which is porportional to crankshaft speed. The boost pressure, ambient atmospheric pressure, and discharge pressure sensors are preferably pulse-width modulated pressure sensors of a type well-known in the art producing signals having duty cycles proportional to sensed pressure levels. The swasher displacement sensor is preferably a linear differential variable transformer (LVDT) producing a voltage signal indicative of pump displacement although other rotary devices, such as a resolver or rotary encoder, may be used.

One or more of the pump sensors 16 and engine sensors 18 produce parameter signals that are input into an engine feedforward control 20 and a pump feedforward control 22. The engine feedforward control 20 provides input to an engine speed governer 24 that responsively modifies the fuel quantity injected in the internal combustion engine 12. The pump feedforward control 22 provides input to a pump displacement control 26 that responsively controls the displacement of the variable displacement hydraulic pump 14.

This integration of controls and sensed parameters allows the system to operate more effectively to respond to sensed loads exceeding available power and to reduce engine speed undershoot and oscillation. By way of example, boost pressure is used as an input to the pump feedforward control to allow boost pressure to build up before pump displacement is increased when the load on the hydraulic implements suddenly increases. If load is sharply increased without first allowing boost pressure to build up, emissions are increased because there is insufficient air for the amount of fuel being injected due to the surge in load. Timing is generally advanced for this condition, which increases combustion temperature.

Similarly, discharge pressure and pump displacement are utilized by the engine feedforward control 20 to provide anticipatory signals to the engine speed governer that the hydraulic load is increasing above the maximum power output of the engine. Both feedforward controls 20,22 are supplemented with engine speed to further improve control. For example, the pump response may be slowed to allow the engine to catch up to rapid load changes whereby the oscillatory response of engine speed is reduced.

Figure 3:
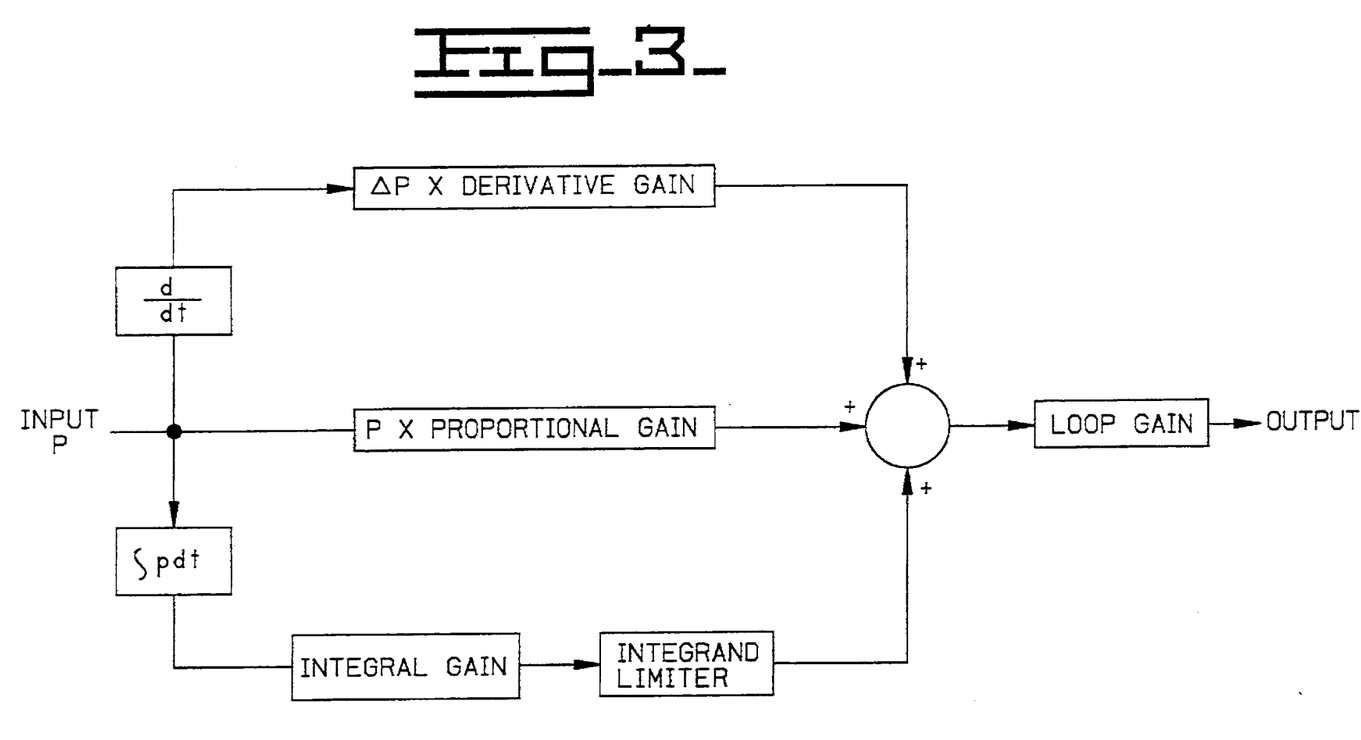
FIG. 3 is a diagrammatic illustration of a pump displacement control.

In the preferred embodiment, the engine speed and pump displacement feedforward controls 20,22 are proportional, integral, derivative (PID) type controls that are well-known in the art of control systems. A diagram of a generic PID control is shown in FIG. 3. Where multiple sensor inputs are connected to the feedforward control, the respective PID control functions for the input parameters are cascaded in parallel along with appropriate digital low-pass noise filters with the respective outputs summed.

The respective coefficients for each of the proportional, integral, and derivative components of the control are determined either empirically using well-known Ziegler-Nichols tuning techniques or analytically using root locus and Bode design methods. In the latter case, frequency response measurements are made at a number of different operating points of the hydraulic power system to produce a data base of information from which a dynamic model is synthesized using a signal analyzer.

The family of transfer functions describes the best-worst case open loop dynamics of the system. In the preferred embodiment, the dynamic models are obtained by standard curve-fitting techniques using both the best and worst response characteristics (transfer function measurements) of the system under test. Each control coefficient is highly optimized for the specific hydraulic power system.

It should be understood that each of the proportional, integral, and derivative components of the PID algorithm may not warrant inclusion. That is, it may be determined by the aforementioned design methods that one or more of the components does not significantly contribute to the control action and therefore should be eliminated from the control to minimize computational complexity.

As an example of the derivation of the control law and coefficients, the engine speed control may be modeled by a dynamic system whose input is commanded setting and the ouput is engine speed. The input signal is preferably a swept sign function available from commercially available test equipment. The engine speed response characteristic can be used by the signal analyzer to develop an open-loop transfer function. The transfer function is curve fit by the analyzer yielding coefficients of an ordinary differential equation describing the process dynamics. Root locus and Bode design methods are used to determine PID gains.

Likewise, engine speed can be modeled as a function of pump discharge pressure to provide a transfer function describing the dynamic relationship between these parameters. Together with the information relating to engine speed and commanded fuel injected, a PID control can be designed that allows the amount of fuel injected to be modified in response to changes in pump discharge pressure in an anticipatory fashion minimizing engine speed undershoot. Such a PID control would cause the amount of fuel injected to increase before the hydraulic power demand actually reached a point in excess of maximum engine output power.

Similarly, the engine speed governer response can be interrogated in response to step changes in load. The engine speed governer response characteristics can be mapped to obtain a look-up table of the length of time required for engine speed to drop to a given level along with the corresponding pump discharge pressure. Such a table could be used to design a control algorithm allowing a predetermined amount of lug rather than completely eliminating lug. This is preferably achieved by making changes to the PID control law coefficients. Advantageously, the amount of delay is selected in response to the empirical tabular data correlating engine response with discharge pressure. The delay required to allow boost pressure to build up following step changes in load can be obtained in a similar manner to reduce transient emissions and fuel consumption caused by rapid increases in load.

It is also advantageous to include an operator interface 27 to allow the operator to select S0. The operator interface may include a dial or lever connected to a potentiometer for providing signals to the pump and engine feedforward controls 20,22 being indicative of the desired engine operating speed S0. The coefficients of the PID controls may be altered in response to the signal from the operator interface 27 to provide the desired engine speed undershoot and settling time characteristics. In the preferred embodiment, the coefficients are included in a look-up table and are correlated with each of the possible signals or ranges of signals that may be received from the operator interface 27.

Figure 4A:
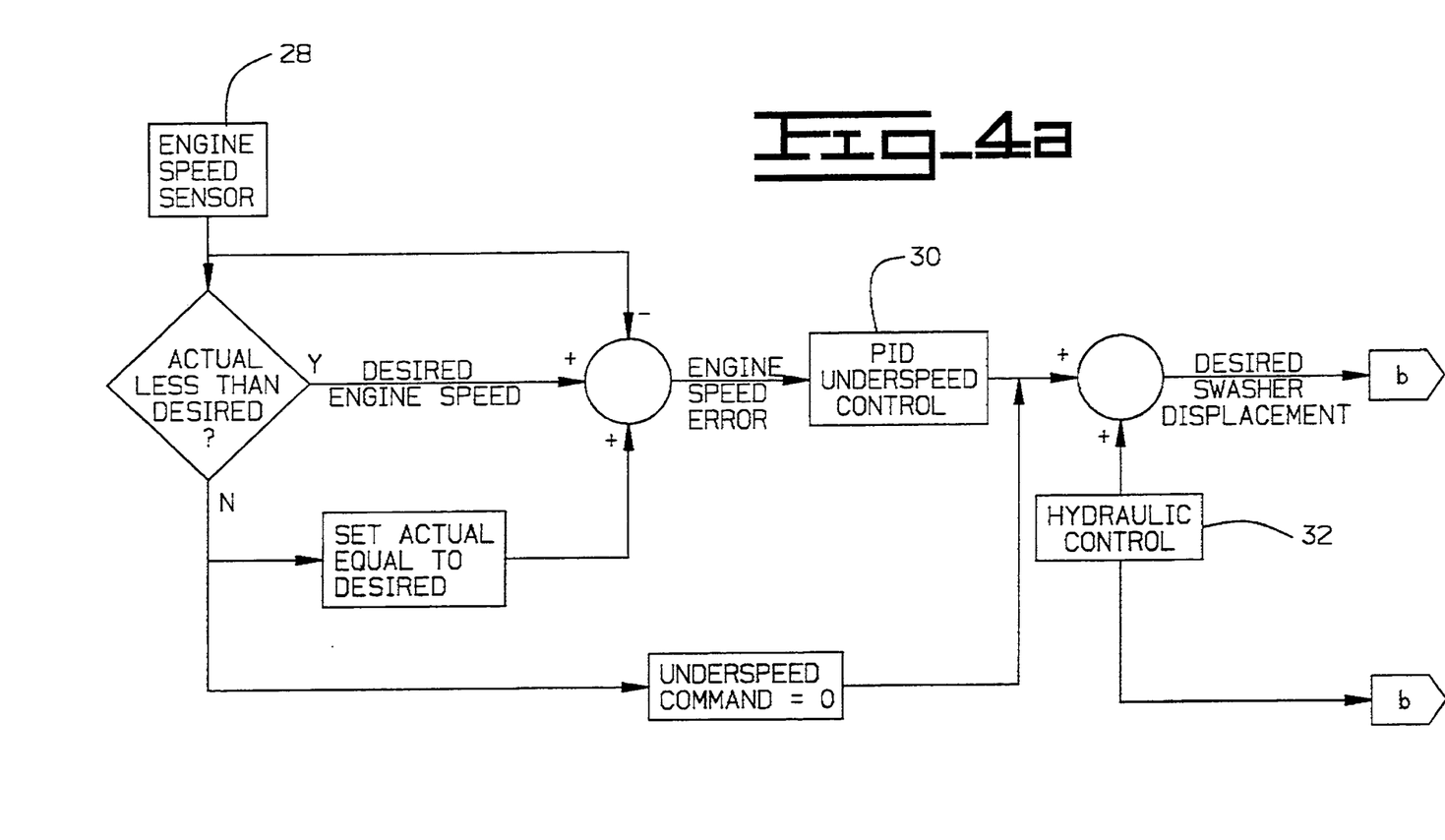
FIGS. 4a and 4b are a diagrammatic illustrations of an engine rack control.
Figure 4B:
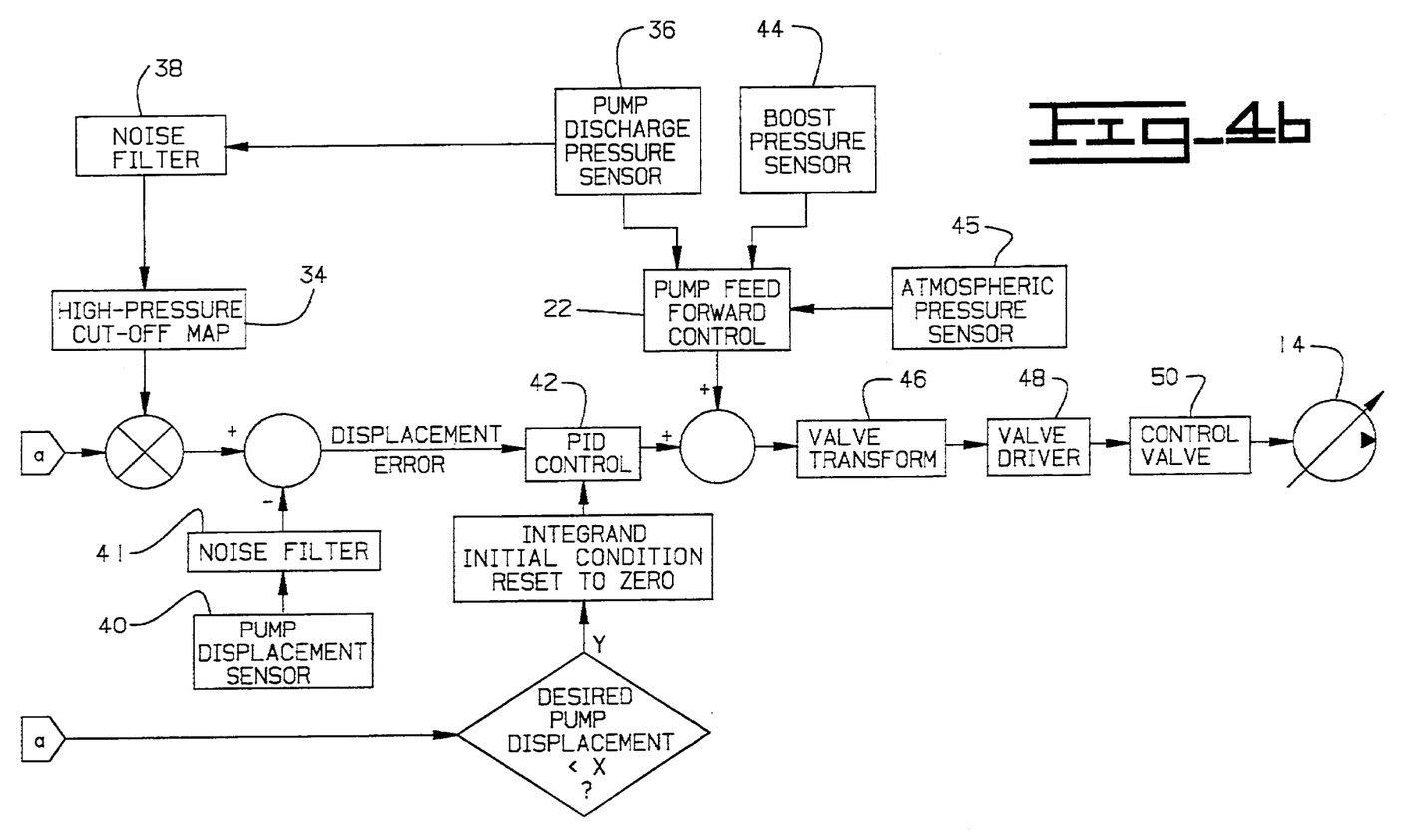

Turning now to the pump control as illustrated by FIGS. 4a and 4b. The control functions are preferably implemented digitally using a Motorola 16 or 32 bit microprocessor (not shown) programmed using the C language. The engine speed sensor 28 produces a signal that is processed in a manner well-known in the art to provide a signal that is indicative of engine speed and can be manipulated by the microprocessor. The actual engine speed from the engine speed sensor is compared to a desired engine speed.

In the preferred embodiment, a single desired engine speed signal is used and corresponds to the engine peak horsepower operating point. It should be understood, however, that multiple desired engine speeds could be used and would be selected to correspond with each of the possible throttle settings or ranges of throttle settings. If actual engine speed is less than desired, the engine-pump underspeed control calculates the difference between actual and desired and produces an engine speed error. The engine speed error is passed through a PID underspeed control 30. As described above, PID underspeed control 30 has coefficients derived from empirical measurements of system dynamics and preferably includes proportional, integral, and derivative components.

If the actual engine speed is greater than desired, actual engine speed is set equal to desired and the resultant underspeed command is equal to zero. Thus, pump displacement is not affected by actual engine speed.

The underspeed command from the PID underspeed control 30 is combined with a command from a hydraulic control 32 to obtain a desired swasher displacement. In the preferred embodiment, the hydraulic control 32 produces a signal indicative of the pump displacement required to achieve the hydraulic flow being requested by the operator via the control levers or other input devices. In effect, the signal from the hydraulic control 32 represents the sum of requested hydraulic flow.

The desired swasher displacement is multiplied by a signal received from a high-pressure cut-off map 34. The high-pressure cut-off map 34 receives a signal from the pump discharge pressure sensor 36 via a low-pass noise filter 38 of a type well-known in the art. The high-pressure cut-off map 34 produces an output between 0 and 1 in response to pump discharge pressure. For most pressures, the output is 1; however, if pump discharge pressure exceeds a predetermined high-pressure level, the output begins to decrease and ultimately reaches zero at a second predetermined high-pressure level. This avoids wasting energy by pumping fluid over the relief valve in the implement circuit.

The product of desired pump displacement multiplied by the high-pressure cut-off map output is then used to determine a swasher error by subtracting actual swasher displacement therefrom. Actual pump displacement is determined in response to the signal from the pump displacement sensor 40 and preferably includes a low-pass noise filter 41.

The swasher error is then fed into a PID control 42 having proportional, integral, and derivative components. Advantageously, the integrand initial condition is set equal to zero if the desired pump displacement is less than a predetermined constant. The PID control 42 preferably includes coefficients which provide an output corresponding to the proper change of displacement necessary to correct for the engine underspeed condition.

The output of the PID control 42 is combined with the output from the pump feedforward control 22 which is designed to both anticipate future overload conditions (hydraulic power exceeds engine power) in response to pump discharge pressure and allow boost pressure to increase in response to sudden increases in load. The pump feedforward control 22 is preferably a PID control receiving input from both the pump discharge pressure sensor 36, the boost pressure sensor 44, and the ambient atmospheric pressure sensor 45, i.e. a multi-input, single output control algorithm. Advantageously, the portion of the pump feedforward control 22 being responsive to pump discharge pressure includes proportional and derivative components and only applies the derivative component when discharge pressure is changing at a rate greater than a predetermined rate. The portion of the pump feedforward control being responsive to boost pressure advantageously includes similar control actions. The coefficients are determined from empirically generated models using root locus and Bode design methods.

The pump feedforward control 22 drives a control valve 50 as a function of discharge pressure. When discharge pressure goes up and boost pressure goes down, the feedforward quickly destrokes the pump in anticipation of the increased load on the engine. The closed loop control on displacement acts to bring the pump back to the desired displacement when the load transient is over.

The signal representing the combined output of the pump feedforward control 22 and the PID control 42 is delivered to a valve transform 46. The valve transform 46 includes a map of steady state performance of pump control hardware and serves to linearize the behavior of the electrohydraulic pump control. The valve transform 46 thus compensates from the otherwise changing gain of the hardware and serves to maintain control stability.

The output from the valve transform 46 is delivered to a valve driver 48 which responsively produces a signal having a current level corresponding to the desired movement of the control valve 50 to change the displacement of the variable displacement hydraulic pump 14. The control valve 50 is a solenoid actuated pressure reducing hydraulic valve of a type well-known in the art. In the preferred embodiment, the control valve 50 and hydraulic pump 14 are designed such that the pump is at full displacement when the signal to the valve driver 48 is zero and is at zero flow when the signal to the valve driver 48 is at maximum current.

Figure 5:
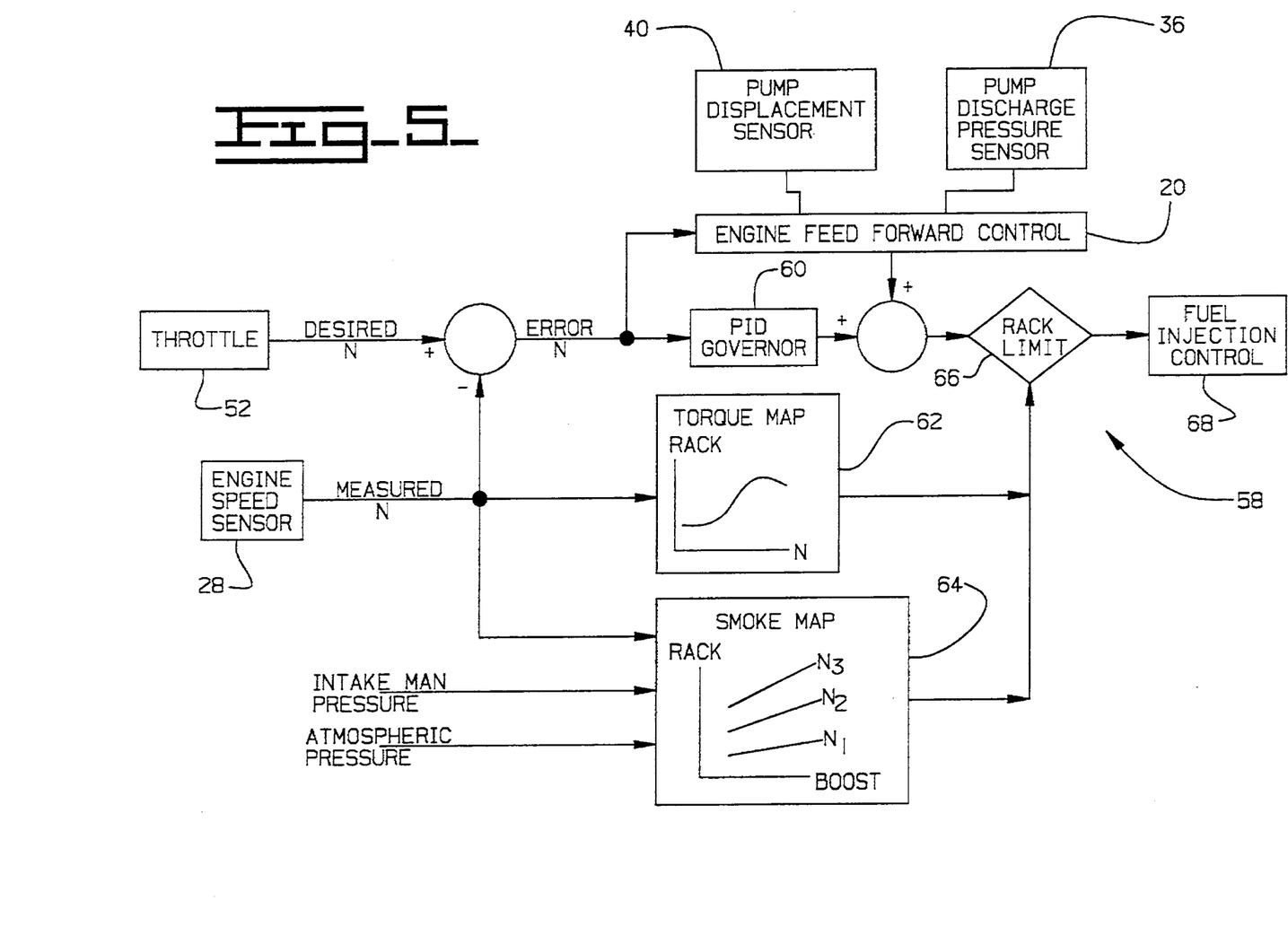
FIG. 5 is a diagrammatic illustration of a generic proportional, integral, differential control.

With reference to FIG. 5, an engine control is shown and includes a throttle 52 of a type well-known in the art for allowing the operator to input desired engine speed.

In a preferred embodiment, an engine speed governer control 58 includes a PID governer 60, a torque map 62, a smoke map 64, the engine feedforward control 20, and a rack limiter 66. The PID governer 60 receives an engine speed error signal produced in response to the desired engine speed from the throttle 52 and the actual engine speed indicated by the signal from the engine speed sensor 28. The PID governer 60, in response to the engine speed error signal, produces an injection duration signal that is combined with a supplemental fuel signal from the engine feedforward control 20. The PID governer 60 advantageously includes proportional, integral, and derivative components. The coefficients are determined empirically to produce the appropriate injection duration to compensate for the changes in engine speed.

The engine feedforward control 20 preferably recieves engine speed error and input from the pump displacement sensor 40 and pump discharge pressure sensor 36. The PID controls incorporated in the engine feedforward control for each of the input parameters are cascaded in parallel and summed up. The pump discharge pressure and displacement are used to anticipate overload conditions and to control the lug characteristics of the engine, engine speed error is used to control engine lug characteristics.

The torque map 62 includes a look-up table of injection duration versus engine speed and indicates the maximum acceptable rack setting for the engine speed so that maximum torque is not exceeded.

The smoke map 64 receives intake manifold pressure, atmospheric pressure, and engine speed signals and includes a look-up table of injection duration versus boost pressure for a plurality of engine speeds. The injection duration corresponding to a given boost pressure and engine speed is selected to prevent excessive particulate emissions.

The rack limiter 66 selects the lesser of the three received injection duration signals and delivers the selected signal to a fuel injection control 68 of a type well-known in the art for controlling the amount of fuel being injected into the internal combustion engine 12.

INDUSTRIAL APPLICABILITY

In operation, the present invention controls the hydraulic power unit of a construction machine to prevent engine stall when hydraulic power demand exceeds available engine horsepower. The hydraulic power unit includes an internal combustion engine and one or more variable displacement hydraulic pumps. Control is improved by increasing the number of performance parameters being used to control engine speed and pump swasher displacement so as to reduce engine speed undershoot and oscillation. Similarly control is improved by causing the hydraulic system, particularly the engine speed governer control and pump displacement controls, to respond before the hydraulic power actually reaches a level exceeding available engine power. The improved hydraulic system provides increased productivity and reduces emissions and fuel consumption by coordinating engine and pump controls.

While the present invention has been described primarily in association with hydraulic excavators, it is recognized that the invention could be implemented on most any engine and hydraulic pump arrangement. Similarly, while the invention was described in connection with only one variable displacement hydraulic pump, it should be understood that many construction machines, particularly hydraulic excavators, will include multiple variable displacement hydraulic pumps.

Other aspects, objects, advantages and uses of this invention can be obtained from a study of the drawings, disclosure, and appended claims.

I claim:

1. An apparatus for controlling a hydraulic system having an engine and a variable displacement pump, comprising:

means for sensing a hydraulic system operating parameter and responsively producing a parameter signal being indicative of the load on the engine;

a pump control for varying the displacement of the variable displacement pump in response to said parameter signal indicating a load on the engine increasing above a predefined level;

delay means for restricting the response of said pump control to allow the engine to reach a predefined operating state; and wherein said engine includes a turbocharger and said delay means restricts the response of said pump control in response to turbocharger boost pressure.

2. An apparatus, as set forth in claim 1, including means for controlling the rack setting of the engine and wherein said rack setting is controlled in response to said boost signal.

3. An apparatus, as set forth in claim 1, including means for controlling fuel delivery to the engine and wherein said fuel delivery is controlled in response to said boost pressure signal.

4. An apparatus for controlling a hydraulic system having an engine and a variable displacement pump, comprising:

means for sensing a hydraulic system operating parameter and responsively producing a parameter signal being indicative of the load on the engine;

a pump control for varying the displacement of the variable displacement pump in response to said parameter signal indicating a load on the engine increasing above a predefined level;

delay means for restricting the response of said pump control to allow the engine to reach a predefined operating state;

wherein said predetermined operating state is a predetermined amount of lug; and an operator interface for allowing an operator to adjust said predetermined amount of lug.

5. An apparatus, as set forth in claim 4, wherein said operator interface includes a setting for substantially eliminating lug.

6. An apparatus for controlling a hydraulic system having a variable displacement pump and an engine having a turbocharger, comprising:

means for sensing a hydraulic system operating parameter and responsively producing a parameter signal being indicative of the load on the engine;

means for sensing the boost pressure of the turbocharger and responsively producing a boost signal;

a pump control for varying the displacement of the variable displacement pump in response to said parameter signal indicating a load on the engine increasing above a predefined level; and delay means for restricting the response of said pump control to allow said boost signal to reach a predefined level.

7. An apparatus, as set forth in claim 6, wherein said delay means reduces the rate of change of displacement.

8. An apparatus, as set forth in claim 6, wherein said pump control includes a transfer function and said delay means includes coefficients in said transfer function that restrict the response of said pump control to allow the engine to reach a predefined operating state.

9. An apparatus, as set forth in claim 6, including means for controlling the rack setting of the engine and wherein said rack setting is controlled in response to said boost signal.

* * * * *